United States Patent [19]

Gascon

[11] 4,292,794
[45] Oct. 6, 1981

[54] RAKE

[76] Inventor: Lorenzo Gascon, 175 Archambault St., Hull, Quebec, Canada

[21] Appl. No.: 120,787

[22] Filed: Feb. 12, 1980

[51] Int. Cl.³ .............................................. A01D 7/00
[52] U.S. Cl. ............................. 56/400.16; 56/400.12; 56/400.18
[58] Field of Search ........... 56/400.04, 400.07, 400.17, 56/400.18, 400.19, 400.2, 400.16

[56] References Cited

U.S. PATENT DOCUMENTS

| | | | |
|---|---|---|---|
| 1,751,481 | 3/1930 | La Tourrette | 56/400.07 |
| 2,486,395 | 11/1949 | Erickson | 56/400.12 |
| 3,258,903 | 7/1966 | Rienacker et al. | 56/400.18 |
| 3,601,966 | 8/1971 | Kerry | 56/400.12 |
| 3,727,389 | 4/1973 | Huspen | 56/400.18 |
| 4,037,397 | 7/1977 | Fiorentino | 56/400.12 |

FOREIGN PATENT DOCUMENTS 1027412  3/1978  Canada .............................. 56/400.12
919607  2/1963  United Kingdom .............. 56/400.12

Primary Examiner—Paul J. Hirsch
Attorney, Agent, or Firm—Browdy and Neimark

[57] ABSTRACT

A pick-up rake having a main rake head and an auxiliary rake head movably mounted with respect to the main rake head enabling the auxiliary rake head to be moved to an upper laterally-compacted position enabling the rake to be used in conventional fashion and movable to a lowered laterally-expanded position where the two rake heads cooperatively act to grasp leaves and grass and the like.

2 Claims, 5 Drawing Figures

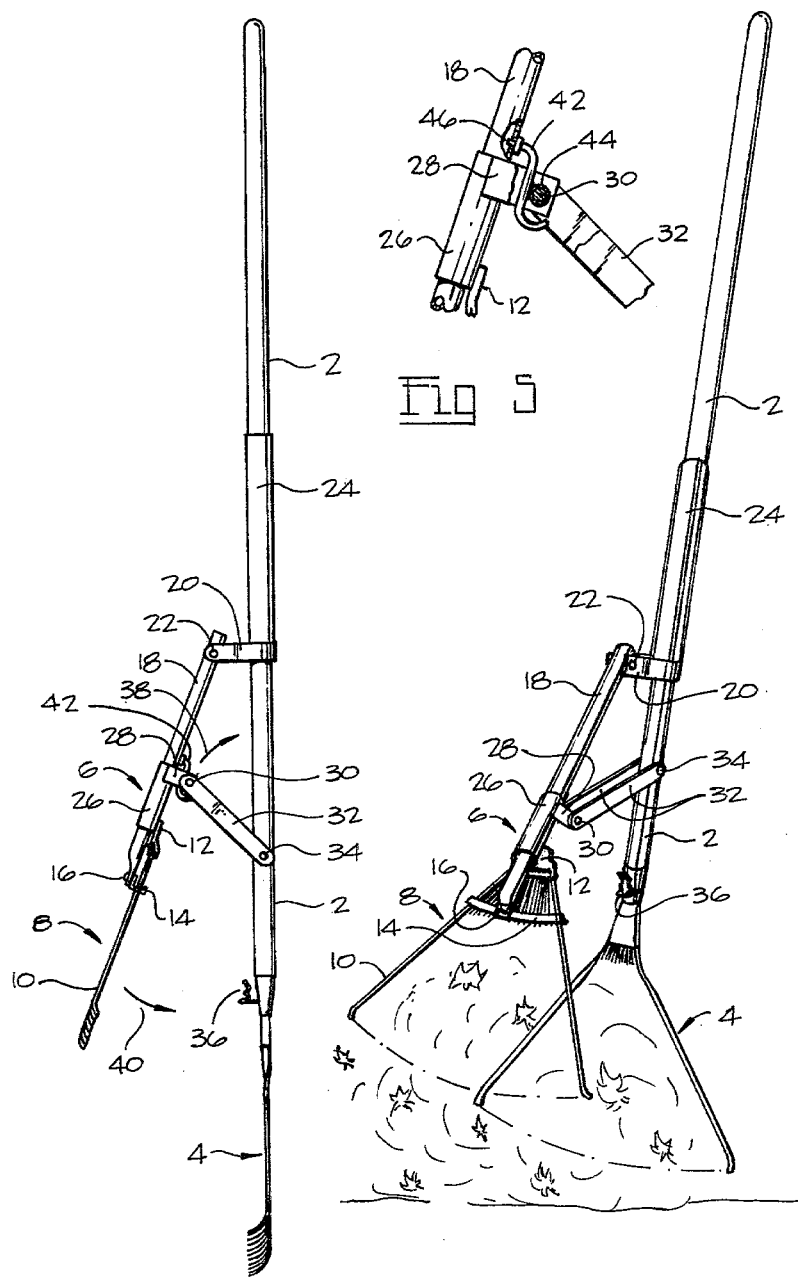

RAKE

The present invention relates to a rake and more particularly to a rake having auxiliary rake head means cooperating with a fixed rake head for enabling piles of leaves, grass or the like to be grasped and picked-up to simplify disposal in a container or wheelbarrow or other suitable receptacle.

The rake of the present invention is particularly advantageous inasmuch as it avoids the necessity of one having to stoop or kneel to gather leaves or grass for disposal for the movable action of the auxiliary and main rake heads enables the grasping and lifting and disposal of leaves or grass while the user remains in a standing position.

More specifically, the rake of the invention consists of a main rake handle having fixed at one end a main rake head of conventional design and construction and which enables the raking or sweeping of leaves or grass in a conventional manner. Movably attached to the main rake handle is an auxiliary or secondary rake head which is movable as desired from a compact storage position to an extended leaf and grass grasping position so that leaves and grass grasped between the rake heads may then simply be raised by the user and the rake heads then opened to dispose of the leaves, or grass, or clippings, in a convenient manner without requiring the user to stoop or kneel to gather and collect the leaves.

DESCRIPTION OF PRIOR ART

The present applicant is the inventor and patentee in Canadian Pat. No. 1,027,412, granted Mar. 7, 1978, and entitled "Rake". This prior Canadian Patent relates to a leaf and grass collecting rake generally similar to the arrangement of the present invention, and the rake of the prior Patent has been found to be efficient in its dual function of enabling the raking of leaves in conventional manner, and also when used in the collecting and lifting of leaves and grass debris. With the arrangement of this Canadian Patent, however, the first and second rake heads are of generally similar width, and when in raised storage position, it has been found that the width of the raised rake head portion at times interferes with conventional raking movement by the user. The present invention improves the rake of applicant's prior Patent by providing means for reducing the width of the auxiliary or second rake head when it is in its upper storage position, this arrangement avoiding interference during conventional raking movements, but which arrangement also enables the auxiliary rake head to assume a width generally similar to that of the main rake head during its function as a debris collector and lifter.

Other prior patent documentation known to the applicant and relating to rakes of the pick-up variety are as follows:
U.S. Pat. No. 2,797,544—July 2, 1957—H. H. Fite
U.S. Pat. No. 2,891,374—June 23, 1959—G. G. Richmond
U.S. Pat. No. 2,746,234—May 22, 1956—A. B. Utley
Canadian Pat. No. 452,621—Nov. 16, 1948—M. F. Zifferer The disadvantage of U.S. Pat. No. 2,891,374 is similar to that of Canadian Pat. No. 1,027,412 discussed above, and the remaining patents relate to pick-up rakes which are of different structural design and wherein provision is not made for raising an auxiliary rake head to upper storage position.

OBJECTS OF THE PRESENT INVENTION

The main object of the present invention is to provide a rake of the pick-up variety and wherein an auxiliary rake head is movably mounted with respect to fixed rake head of conventional design and which auxiliary rake head is selectively movable to a lowered laterally-extended tine position for pick-up use and to a raised laterally-compacted tine position enabling the rake to be used in conventional fashion.

More specifically, an object of the present invention is to provide a pick-up rake comprising a rake handle having a main rake head secured to its lowermost end, and an auxiliary rake head assembly including an auxiliary rake head carried by the rake handle and selectively movable from an upper laterally-compact storage position enabling normal raking to a lower laterally-extended position enabling leaves, grass and debris to be gathered and held between the two rake heads, the auxiliary rake head assembly also including a shaft pivotally secured at its upper end to a handle sleeve which is slidable along the rake handle, the auxiliary rake head having a plurality of tines carried by the shaft, and a pair of links pivotally interconnecting the rake handle and the auxiliary rake head shaft, and means laterally-compacting the tines of the auxiliary rake head when raised to upper storage position, and when the auxiliary rake head is moved to lowered pick-up position.

In preferred construction, the means for laterally compacting and expanding the tines consists of a shaft sleeve slidably mounted on the shaft, one end of the links being pivotally secured at their other ends to the rake handle between the main rake and the handle sleeve, the upper ends of the tines of the auxiliary rake head being secured closely together on a tine-plate which is secured to the shaft sleeve, the said tines being slidably movable through a tine-guide which is fixedly secured to the lower end of the shaft.

BRIEF DESCRIPTION OF THE ACCOMPANYING DRAWINGS

FIG. 3 is a side elevational view of the rake in the position as shown in FIG. 2;

FIG. 4 is a perspective view of the rake in its orientation to collect and grasp leaves and grass. For clarify, all of the tines of the rake heads are not shown; and FIG. 5 is an enlarged perspective view of a portion of the pivoting means associated with the auxiliary rake head.

DETAILED DESCRIPTION OF THE ACCOMPANYING DRAWINGS

Figure 1:
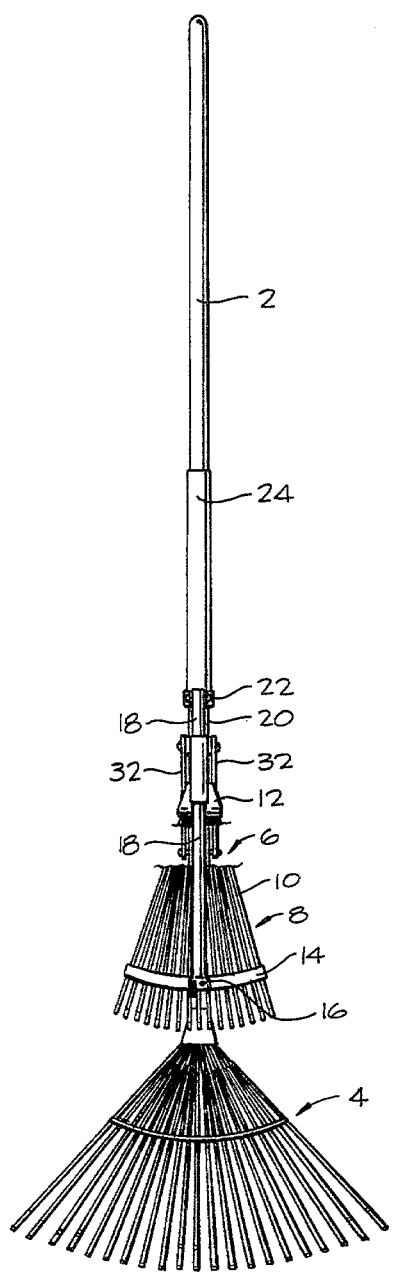
FIG. 1 illustrates in elevational view the rake according to the present invention wherein the upper or auxiliary rake head is in its collapsed storage position enabling leaves or grass to be swept in conventional manner.

The present invention will now be described with reference to the accompanying drawings wherein like reference numerals refer to like parts. In the drawings, a main rake handle is shown by numeral 2, and numeral 4 generally indicates a main rake head which is connected to the lower end of the rake handle 2 by conventional means.

A second or auxiliary rake head assembly is shown generally by numeral 6. This assembly includes an auxiliary rake head 8 which consists of tines 10 which are all held at their uppermost ends by a tine-end holding plate 12 (hereinafter called tine-plate). An actuate tine-guide strip 14 is securely fixed to the lower end 16 of a shaft 18; the upper end of the shaft 18 being pivotally secured to bracket 20 by suitable means such as a rivet 22; and the bracket 20 being fixedly secured to handle sleeve 24 which is slidable along the rake handle 2.

The tine-plate 12 is securely fastened to shaft sleeve 26 to which sleeve is fixedly secured shaft sleeve bracket 28.

Bracket 28 is pivotally secured as at 30 to a pair of links 32 which in turn are pivotally secured as at 34 to handle 2 at a position between sleeve 24 and main rake head 4.

The lower end of the rake handle 2 is provided with an auxiliary rake head retaining clip or flange 36 as clearly shown in FIG. 3.

Figure 2:
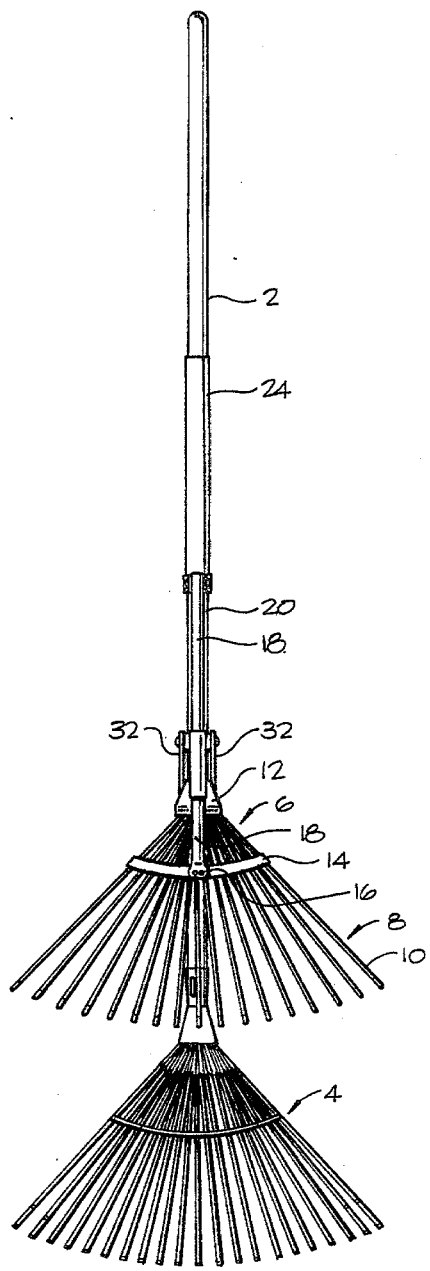
FIG. 2 illustrates in elevational view the rake as shown in FIG. 1 but wherein the auxiliary rake head is elevated and extended to its full width position enabling the two rake heads to be used for leaf and grass pick-up.

FIGS. 2, 3 and 4 show the auxiliary rake head 8 in its full lateral width position ready for use in association with the main rake head 4 to collect and gather leaves and grass. It will be appreciated from FIG. 4 that sliding movement of sleeve 24 downwardly with respect to the main handle 2 will, through the pivoting action of pivots 22, 30 and 34, cause the auxiliary rake head to move toward the main rake to gather and hold collected leaves therebetween. With the rake heads in this position and with grass and leaves and other debris held therebetween the rake can then simply be lifted for discharge of the leaves and grass into a suitable receptacle. For discharge of leaves and debris from between the two rake heads it is simply necessary to slide sleeve 24 upwardly with respect to main handle 2, to the position as shown in FIG. 4.

To position the auxiliary rake head assembly to its storage position as shown in FIG. 1, it is simply necessary to slide sleeve 24 upwardly with respect to main handle 2 (see FIG. 3). This movement drawing the auxiliary rake assembly upwardly as a result of the interaction between sleeve 24, bracket 20, and auxiliary shaft 18. During this movement, the links 32 will pivot inwardly in the direction generally shown by arrow 38 in FIG. 3 and this will cause the tines 10 of the auxiliary rake head 8 to move toward the main rake head 4 in a direction as shown by arrow 40 in FIG. 3. The length of links 32 limit the amount of upward movement of shaft sleeve 26 to which the tine-plate is fixedly secured. At the uppermost position of travel of sleeve 24 and the pivotally interconnected parts the configuration of the tines 10 of the auxiliary rake head 8 will be as shown in FIG. 2, and the pair of links 32 will be oriented in parallel on each side of the main handle 2 as shown in FIG. 2.

As discussed above, the upper ends of tines 10 of the auxiliary rake head are fixedly secured to tine-plate 12 which in turn is fixedly secured to sleeve 26. By holding the rake assembly in position wherein the auxiliary rake head 8 is on the upper side, and by sliding sleeve 24 toward head 4, the lateral width of the tine fan of the auxiliary rake head 8 will be reduced to that width as shown in FIG. 1, and further downward sliding of sleeve 24 moves shaft 18 along the parallel with handle 2 until the lower end 16 of shaft 18 is received and held within clip 36. This is the result of the following: sleeve 26 is held against longitudinal movement with respect to main bundle 2 by links 32 which in their uppermost position are beside and parallel with handle 2. Downward movement of sleeve 24 then causes shaft 18 to move downwardly within sleeve 26 (which is then in stationary position) and the downward movement of tine-plate 12 from the position shown in FIG. 2 to the position shown in FIG. 1 causes the tines 10 to be laterally compacted to the position shown in FIG. 1. Further downward movement of sleeve 24 positions the end 16 of the auxiliary shaft 16 beneath clip 36 and in which position the auxiliary rake head is compacted laterally and is held in secure position so that the rake can be used in normal raking fashion.

To once again laterally extend the auxiliary rake head to its leaf encircling and gathering position the rake assembly is turned so that the auxiliary rake head faces downwardly and the sleeve 24 is then moved upwardly along the main handle 2 with the result that the end 16 of shaft 18 is withdrawn from beneath clip 36, and then downward movement of the sleeve 24 permits the auxiliary rake head to fall open to the position as shown in FIG. 3.

In preferred construction means are provided for interacting between the shaft 18 and sleeve 26 to prevent sleeve 26 from sliding along shaft 18 when the rake is in upright leaf-collecting position to provide a more positive leaf-clamping action between the rake heads. Suitable means for accomplishing this are shown in FIG. 4 and in enlarged more detailed view in FIG. 5. The positioning of sleeve 26 with respect to shaft 18 in FIG. 5 is the same as that shown in FIG. 4, that is, the shaft 26 is in its lowermost position of travel with respect to shaft 18. As outlined above, sleeve 26 carries a bracket 28 to which the outer ends of links 32 are pivotally secured by pivot pin or rivet 30. As shown in FIG. 5 a locking arm 42 is positioned between the arms of bracket 28 and is pivotally carried by rivet 30. This is accomplished by securing (by welding or the like) locking arm 42 to a sleeve 44 which is rotatably carried by rivet or pivot pin 30. A hole (not numbered) is provided in shaft 18 and when sleeve 26 is in its lowermost position the upper end 46 of locking arm 42 will engage in the hole in shaft 18 (as shown in FIG. 5) to hold the sleeve 26 against any sliding movement with respect to shaft 18.

When it is desired to move the auxiliary rake head to upper laterally-collapsed storage position the rake handle 2 is held in a more or less horizontal position with the auxiliary rake head on top and the locking arm 42 will pivot on rivet 30 to withdraw upper end 46 from the hole in the shaft 18 thus enabling sleeve 26 to slide upwardly with respect to shaft 18 to the rake-collapsed position as shown in FIG. 1.

The presence of means locking the sleeve 26 against sliding movement on shaft 18 is not essential for successful operation but clamping of leaves or grass between the rake heads is more positive when the locking means are present. Locking means other than that shown in FIG. 5 could of course be used.

The rake components may be of any suitable material, and the main handle may be of wood or aluminum or like light-weight metal. The tines may be of spring-steel and the remaining components may be of plastic or light-weight metal.

I claim:

1. A pick-up rake comprising a rake handle having a main rake head secured to its lowermost end, and an auxiliary rake head assembly including an auxiliary rake head having a plurality of tines carried by the rake handle and selectively movable from an upper storage position enabling normal raking to a lower position enabling leaves, grass and debris to be gathered and held between the two rake heads, the auxiliary rake head assembly also including a shaft pivotally secured at its upper end to a handle sleeve which is slidable along the rake handle, the upper ends of the tines of the auxiliary rake head being secured closely together on a tine-plate which is secured to a shaft sleeve freely slidable along the shaft, the tines being slidably movable through a tine-guide which is fixedly secured to the lower end of the shaft, and a pair of links pivotally interconnecting the rake handle and the shaft sleeve, full upward movement of the handle sleeve along the handle moving the auxiliary rake head to storage position and downward movement moving the auxiliary rake head to gathering position, in gathering position the shaft sleeve being downwardly positioned with respect to the shaft to extend the tines through the tine-guide spreading the lower ends of the tines of the auxiliary head, and in storage position the shaft sleeve being upwardly positioned with respect to the shaft to draw the tines through the tine-guide to bring the lower ends of the tines together, and a flange on the lower end of the rake handle to receive and hold the lower end of the shaft when the auxiliary rake head is in storage position.

2. A rake according to claim 1, including a locking arm to secure the sleeve, when in its lowermost position with respect to the shaft against sliding movement along the shaft, the locking arm being pivotally carried by the shaft sleeve and engaging in a hole in the shaft during upright orientation of the rake handle during gathering, the locking arm pivoting from engagement in the hole upon horizontal orientation with the auxiliary rake head uppermost enabling movement of the shaft sleeve along the shaft to position the auxiliary rake head in storage position.

* * * * *